Patented June 1, 1954

2,680,098

UNITED STATES PATENT OFFICE 2,680,098

SILICON COMPOUNDS

Iral B. Johns, Jr., Dayton, Ohio, assignor to Monsanto Chemical Company, St. Louis, Mo., a corporation of Delaware No Drawing. Application April 27, 1951,
Serial No. 223,447

4 Claims. (Cl. 252—182)

The present invention relates to methods of preparing silicon compounds and deals more particularly with reaction products of silicon, silica and sulfur.

An object of the present invention is to prepare from readily available, inexpensive starting materials, intermediates which may be employed to give good yields of polysilicates. Another object of the invention is the preparation of mixtures of silicon disulfide and a compound containing only the elements silicon, sulfur and oxygen, which mixtures may be employed for the preparation of valuable organic silicon compounds. Still another object of the invention is the preparation of mixtures of orthosilicates and polysilicates from inexpensive raw materials.

These and other objects of the invention which will be hereinafter disclosed are provided by the following invention wherein there are prepared reaction products comprising silicon disulfide and a compound containing only the elements silicon, oxygen and sulfur upon ignition of a mixture of silicon, sulfur and silica. My copending application Serial No. 223,446 filed April 27, 1951, which is assigned to the same assignee as is the present case describes and claims the process for reacting the present products with organic hydroxy compounds.

The product obtained by ignition of a mixture of silicon, silica and sulfur consists essentially of a mixture of silicon disulfide with a compound which is probably silicon oxysulfide, but which can be correctly described only in terms of the elements of which it is composed, i. e., as a compound containing only silicon, oxygen and sulfur. X-ray analysis of the ignition product shows the absence of elemental silicon, and the presence of a considerably diminished quantity of silica over that present in the original reaction mixture. Such analysis shows the presence of silicon disulfide. The presence of a compound containing the elements silicon, oxygen and sulfur can be ascertained only by the nature of the products which are formed upon reaction of the ignition product with an organic hydroxy compound. Upon treating the ignition product with a hydroxy compound there is obtained not only the orthosilicate which could be expected by the reaction of silicon disulfide and the hydroxy compound according to the scheme:

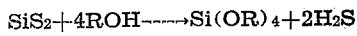

but also a series of polysilicates having the general formula:

Compounds having the above general formula can be formed only if a material supplying the necessary oxygen is present in the reaction mixture. Since no water is present during the preparation of the mixture of orthosilicate and polysilicates, the formation of the latter in yields which equal those of the orthosilicates, shows the presence of an oxygen-containing compound of silicon and sulfur in the ignition product.

While the prior art shows the production of polysilicates by a variety of procedures, e. g., by esterification of polysilicic acids, by reaction of silicon oxychloride with alcohols or phenols, or as in the Italian Patent No. 436,808, to Lamberto Malatesta, dated June 14, 1948, by the reaction of silicon disulfide with aqueous alcohols, the prior methods have been of little commercial interest because either the initial materials were difficultly obtainable or because the yields of the polysilicates were too low for practical application. The silicon disulfide of the Malatesta process is obtainable only at the expense of employing only elemental silicon as the silicon source. In the present process half of the silicon present in the ester products is derived from silica. That as cheap a source as silica can be utilized directly for the production of the hitherto difficultly obtainable organic silicates constitutes a major advancement in the art.

In preparing the mixture of silicon sulfide and the silicon-oxygen-sulfur compound of the present invention, I mix silicon with silica and sulfur in a molar proportion which is advantageously 1:1:2, but which may deviate from that value in any way depending upon the proportion of silicon disulfide and the silicon-oxygen-sulfur compound desired in the ignition product. Since the reaction is assumed to proceed substantially according to the scheme:

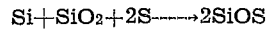

stoichiometric proportions of the reactants are advantageously employed. The formation of silicon disulfide from its elements is known to be a highly exothermic reaction; and while neither the identity of the present ignition products nor the responsible reaction mechanism are known it may be assumed that the extreme heat which is developed by the formation of silicon disulfide permits the formation of a silicon-oxygen-sulfur compound which while probably silicon oxysulfide may be a cyclic thioether, or a polymer of either the silicon oxysulfide or the cyclic compound.

In order to retain the exothermic reaction heat of the silicon-sulfur reaction, so that it can be utilized for the silica-sulfur reaction, it is advantageous to employ in the reaction mixture a small quantity say, from 0.5% to 5.0% by weight of the total weight of the silicon, silica and sulfur, of an auxiliary heat-producing substance. The peroxides of barium, sodium or potassium are particularly suitable for this purpose, but other solid heat-producing media, may be employed.

Ignition of the mixture of silicon, sulfur and silica and, if desired, heat-producing agent, may be effected by subjecting the mixture to a temperature of say, at least 2,000° C. and preferably of at least 2,500° C. to 3,500° C. Temperatures of this magnitude may be readily attained by employing thermite ignition; i. e., by using the heat which is liberated in the reaction of a mixture of aluminum and an oxide of a weaker metal. The charge of silicon, silica and sulfur is contained in a highly heat-resistant vessel, e. g., a fire-clay crucible. The thermite, say, a mixture of aluminum and ferric oxide, is placed in the charge, and the mixture is ignited electrically and/or by a primer such as magnesium ribbon. Heat evolved in the thermite reaction then effects ignition of the silicon-silica-sulfur charge. The product of this ignition is generally a brownish, friable material which, as previously stated contains no elemental silicon, only a very small quantity of silica and silicon disulfide and the silicon-oxygen-sulfur compound. The proportion of the last two compounds with respect to each other, when the composition of the initial reaction mixture observes stoichiometric proportions, is generally in the order of 1:1.

This ignition product is employed directly, without further treatment or isolation of constituents, for the preparation of organic esters of orthosilicic or polysilicic acids. The proportion of orthosilicates to polysilicates which is obtained depends upon the proportion of silicon disulfide to the silicon-oxygen-sulfur compound which is present in the ignition product.

Saturated organic hydroxy compounds, generally, may be employed for the preparation of the silicates. Advantageously there may be employed saturated alcohols or phenols of from 1 to 18 carbon atoms, e. g., aliphatic alcohols such as methanol, ethanol, isopropanol, n-butanol, tert-n-butanol, n-hexanol, n-heptanol, 2-ethylhexanol, n-octanol, lauryl alcohol, octadecyl alcohol, etc., the aralkyl alcohols such as benzyl alcohol or 2-phenylethanol; and phenols such as phenol, cresol, p-ethylphenol, β-naphthol, 2-hydroxybiphenyl, etc.

Reaction of the ignition product with the hydroxy compounds is effected readily by simply contacting the ignition product with the hydroxy compound and allowing the resulting mixture to stand at ordinary or increased temperatures until formation of the silicates and evolution of hydrogen sulfide are complete. Advantageously, increased temperatures, say, the refluxing temperatures of the reaction mixtures, are employed. The proportion of hydroxy compound to the ignition product employed in the reaction mixture is apparently of little importance, the formation of some of the mixture of orthosilicates and polysilicates occurring irrespective of whether one or the other reactant is present in excess. However, in order to assure complete reaction of the ignition product an excess of the more readily available hydroxy compound is employed. The reaction product thus obtained generally consists of some unreacted initial reactants, the orthosilicate and a mixture of polysilicates of varying degrees of polymerization.

The unreacted materials are readily removed from the reaction product by distillation and the resulting mixture of orthosilicate and polysilicates may be employed as such, for a wide variety of commercial purposes, e. g., in the preparation of heat-resistant adhesives and binders, in the formulation of protective coatings, for the water proofing of textiles, as functional fluids, etc. Or, if desired, the orthosilicate may be separated from the mixture by further fractionation to yield a residue consisting of only the polysilicates. While the orthosilicates may be regarded as by-products when the polysilicates are the only desired materials, the orthosilicates themselves are of considerable commercial importance and the present process provides an inexpensive method for their production. In most instances, however, the mixtures of orthosilicates and polysilicates obtainable from the present process may be employed for functions previously assumed to be satisfactorily fulfilled only by the hitherto more difficultly available polysilicates, e. g., the present orthosilicate-polysilicate mixtures are highly useful as heat transfer media, as additives to alkyd resins, for the purpose of improving hardness and the drying rate thereof, etc. When the products are to be used as liquid heat-responsive agents for thermostatic devices, however, the polysilicates are preferably employed in absence of substantial quantities of the orthosilicate. In this case the orthosilicate is removed by distillation. The residue comprises a series of polysilicates of varying degrees of polymerization, i. e., polysilicates having the general formula $$Si_nO_{n-1}(OR)_{2n+2}$$

in which $n$ is greater than one and R is as herein defined. The individual members of the series are separable only with difficulty; however, since they resemble each other very much in properties, resolution of the mixture into its constituents is generally unnecessary. If desired, fractionation of the polysilicate residue to give fractions of polysilicates having a narrow range of molecular weights and polymerization degrees may be carried out.

The invention is illustrated but not limited by the following examples.

*Example 1*

582 g. of a mixture of silicon, silica, sulfur and barium oxide in which the Si:SiO$_2$:S molar ratio was 1:1:2 and in which the barium peroxide was present in the amount of 4.5 g. of BaO$_2$/mole of Si, were placed in a fireclay crucible (130 x 200 mm.). A 4 ft.-length of transite pipe was placed around the crucible to serve as a chimney for carrying away gases and in order to protect the charge from air moisture. A 110 volt-ignition unit was used for firing. Leads from the ignition unit were terminated with a 13 cm.-length of 30 gauge manganin wire which was wound in a small coil and inserted into the thermite charge. The thermite charge was placed in a cavity on the top center of the Si—SiO$_2$—S—BaO$_2$ mixture. The charge was ignited, the ignition product was allowed to cool, and broken up in a mortar. There was thus obtained 560 g. of a mixture comprising silicon sulfide and a compound containing the elements Si, O and S.

Upon refluxing 506 g. of this mixture with anhydrous alcohol for 2 hours, there was obtained 153 g. of tetraethyl orthosilicate probably formed by reaction of silicon sulfide with the alcohol, and 150.8 g. of a mixture of polymeric ethyl silicates formed by reaction of the Si—O—S compound with the alcohol.

Example 2

Two charges, each of which consisted of 28 g. (1 mole) of silicon, 64 g. (2 moles) of sulfur, 60 g. (1 mole) of silica and 3 g. of barium peroxide were respectively ignited as in Example 1. There was thus obtained 143 g. of ignition product from one charge and 143.5 from the other charge. The presence of silicon disulfide and of a compound of Si, O and S in the ignition products was shown by refluxing the combined products (286.5 g.) with 2-ethylhexanol, to yield tetrakis(2-ethylhexyl) orthosilicate and polymeric 2-ethylhexyl silicates.

Example 3

A mixture consisting of 25 g. of sulfur, 10 g. of silicon, 21.5 g. of silica and 1 g. of barium peroxide was ignited as in Example 1. There was thus obtained 52.0 g. of a light brown ignition product which could be easily broken up by hand. The presence of silicon disulfide and of a Si—O—S compound was shown by refluxing the entire ignition product with 120 g. of phenol. There was thus obtained 9.8 g. of tetraphenyl orthosilicate and 33.2 g. of polymeric phenyl silicates.

What I claim is:

1. The process of producing a mixture of silicon disulfide and a compound containing the elements Si, O and S, which comprises igniting a mixture containing approximately 1 mole of silicon, approximately 1 mole of silica and approximately 2 moles of sulfur.

2. The process of producing a mixture of silicon disulfide and a compound containing the elements Si, O and S, which comprises igniting a mixture containing approximately 1 mole of silicon, approximately 1 mole of silica, and approximately 2 moles of sulfur, in the presence of from 0.5% to 5% by weight, based on the total weight of the mixture of silicon, silica and sulfur of an auxiliary heat-producing agent.

3. The process of producing a mixture of silicon disulfide and a compound containing the elements Si, O and S, which comprises igniting a mixture containing approximately 1 mole of silicon, approximately 1 mole of silica, and approximately 2 moles of sulfur, in the presence of from 0.5% to 5% by weight, based on the total weight of the mixture of silicon, silica and sulfur, of a peroxide selected from the class consisting of barium, sodium and potassium peroxides.

4. The process of producing a mixture of silicon disulfide and a compound containing the elements Si, O and S, which comprises igniting a mixture containing approximately 1 mole of silicon, approximately 1 mole of siilca and approximately 2 moles of sulfur, in the presence of from 0.5% to 5% by weight of barium peroxide, based on the total weight of the mixture of silicon, silica and sulfur.

References Cited in the file of this patent

UNITED STATES PATENTS

| Number | Name | Date |
| --- | --- | --- |
| 2,589,653 | Alvarez-Tostado et al. | Mar. 18, 1952 |

OTHER REFERENCES

Mellor, "Comprehensive Treatise on Inorganic and Theoretical Chemistry," Longmans, Green & Co., N. Y., 1925. Pgs. 279–280, 988, are pertinent.

Gazz. chim. ital. 78 702–6 1948, Malatesta. Abstract appears in C. A. V. 43, 2884e 1949. (Copy in P. O. Library.)